United States Patent [19]

Bullis et al.

[11] Patent Number: 5,245,504
[45] Date of Patent: Sep. 14, 1993

[54] METHODOLOGY FOR MANUFACTURING HINGED DIAPHRAGMS FOR SEMICONDUCTOR SENSORS

[75] Inventors: Robert H. Bullis, Avon; Arthur G. Foyt, Glastonbury; James L. Swindal, East Hampton, all of Conn.

[73] Assignee: United Technologies Corporation, Hartford, Conn.

[21] Appl. No.: 906,598

[22] Filed: Aug. 6, 1992

Related U.S. Application Data

[63] Continuation-in-part of Ser. No. 798,834, Nov. 25, 1991, abandoned, which is a continuation of Ser. No. 664,683, Mar. 5, 1991, abandoned, which is a continuation of Ser. No. 317,236, Feb. 28, 1989, Pat. No. 4,998,179.

[51] Int. Cl.[5] .......................... H01G 7/00; G01L 9/12
[52] U.S. Cl. ................................ 361/283.4; 29/25.42; 73/718
[58] Field of Search ........................ 361/283; 29/25.42; 73/718, 724

[56] References Cited

U.S. PATENT DOCUMENTS

| | | | |
|---|---|---|---|
| 4,405,970 | 9/1983 | Swindal et al. | 361/283 |
| 4,415,948 | 11/1983 | Grantham et al. | 361/283 |
| 4,586,109 | 4/1986 | Peters et al. | 361/283 |
| 4,609,966 | 1/9986 | Kuisma | 361/283 |

Primary Examiner—Bruce A. Reynolds
Assistant Examiner—Michael D. Switzer

[57] ABSTRACT

Manufacturing hinged diaphragms for semiconductor sensors (e.g., accelerometers, pressure transducers, etc.), from a SIMOX wafer (W, FIG. 3 A), in which the internal, insulating, silicon dioxide ($SiO_2$) layer (3) is used as an etch stop in removing silicon from the underside of the wafer by etching with an appropriately selective etch, producing the reduced thickness, peripheral "hinge" areas (9; FIG. 3 A to FIG. 3 B), with the exposed part of the silicon dioxide layer being removed in a subsequent etching step (FIG. 3 B to FIG. 3C) using a different, selective etch. This produces a single layer, single-crystal, silicon "hinge" (9'; FIG. 3C) of uniform, continuous material, enhancing the linearity of diaphragm movement during use and the sensor's sensitivity and accuracy. (See FIG. 4 for methodological steps.) If the top, silicon region of the SIMOX wafer is insufficiently thick for the desired diaphragm thickness, additional layer(s) of epitaxial silicon are grown on the upper side of the silicon crystal until the desired thickness is reached; the same being true for increasing the thickness of the silicon substrate. If having reduced thickness areas for the "hinge" on both sides of the diaphragm are desired, a SIMOX wafer having an intermediate, silicon dioxide layer on both the "bottom" and the "top" of the wafer is used, with each layer serving as an etch stop on its respective side, with the then exposed portions of the silicon dioxide layers thereafter being removed, leaving flanking, alternating, silicon "hinge" bridges (90a/90b; FIG. 5A–C).

20 Claims, 4 Drawing Sheets

METHODOLOGY FOR MANUFACTURING HINGED DIAPHRAGMS FOR SEMICONDUCTOR SENSORS

REFERENCE TO RELATED APPLICATIONS

This application relates to some of the same subject matter as the following, co-pending application (of which the present application is a continuation-in-part):

Ser. No. 07/798,834, entitled "Capacitive Semiconductive Sensor With Hinged Diaphragm for Planar Movement" filed Nov. 25, 1991 by D. H. Grantham & J. L. Swindal, abandoned, which in turn was a continuation of Ser. No. 07/664,683 filed Mar. 5, 1991, abandoned, which in turn was a continuation of Ser. No. 07/317,236 filed Feb. 28, 1989, now U.S. Pat. 4,998,179 (issued Mar. 5, 1991), the great-grandparent case hereof; which in turn incorporated the disclosures of:

U.S. Ser. No. 07/292,282, entitled "Capacitive Pressure Sensor With Minimized Dielectric Drift" filed on Dec. 30, 1988 by R. H. Bullis, J. L. Swindal, W. J. Wiegand, C. Brahm & H. Meyer, now U.S. Pat. No. 4,954,925 (issued Sep. 4, 1990); and U.S. Ser. No. 07/292,276, entitled "Capacitive Pressure Sensor With Encircling Third Plate" filed on Dec. 30, 1988 by D. H. Grantham & M. Latina, now U.S. Pat. 4,951,174 (issued Aug. 21, 1990);

the disclosures of all of which are incorporated herein by reference.

TECHNICAL FIELD

The present invention relates to semiconductor sensors or transducers, e.g., accelerometers, pressure sensors, etc., each of which use a "hinged" proof mass or diaphragm to, for example, enhance the linearity of the diaphragm's movement during use. More particularly, the present invention relates to the methodology used to produce or manufacture such diaphragms.

BACKGROUND ART

Semiconductor Sensors Generally

As to the primary technology involved in the present invention, namely, the making of "hinges" in the diaphragms of semiconductive sensors or transducers, reference is had to the great-grandparent case hereof, namely U.S. Pat. No. 4,998,179 (Grantham & Swindal, issued Mar. 5, 1991).

As discussed in the '179 patent, capacitive, semiconductive sensors or transducers, used, for example, for sensing pressure or acceleration or other physical phenomenon, are known.

For example, capacitive pressure sensors are well known and are employed in capacitance transducers, microphones, rupture discs, resonators, vibrators and like devices. Many of the applications for such capacitive pressure sensors require that the sensors be extremely small, for example, of the order of eight millimeters by eight millimeters (8 mm×8 mm).

Silicon capacitive pressure transducers are known in the art. For example, U.S. Pat. No. 3,634,727 to Polye discloses one type in which a pair of centrally apertured, conductive silicon plates are joined together with a eutectic metal bond, such that the silicon disc plates flex with applied pressure, changing the capacitance of the aperture interstice and providing a capacitive-type signal manifestation of pressure magnitude. This form of pressure transducer thus relies on the pressure-induced deflection of a thin diaphragm, in which the diaphragm deflection as a function of fluid pressure causes a variation in the distance between a pair of surfaces which effectively form the plates of a variable capacitor. Other examples of such silicon pressure sensors or transducers are included in the U.S. patents listed below Thus, capacitive pressure sensors are well known and are employed in capacitance transducers, microphones, rupture discs, resonators, vibrators and like devices. Some of the capacitive pressure sensors require that the sensors be extremely small, for example, of the order of about eight millimeters by eight millimeters (8 mm×8 mm) or less and are typically made in a silicon-glass-silicon sandwich design.

Figure 1:
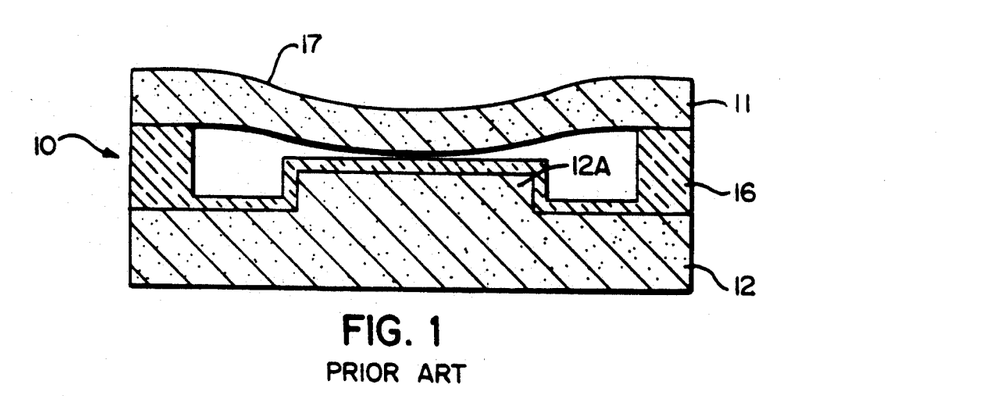
FIGS. 1 & 2 are simplified, side views of the semiconductive sensors of the prior art approach and the hinged approach of the invention, respectively, contrasting the planar movement of the central region of the hinged diaphragm of the invention (the latter) with the non-planar movement of the prior art, which non-planar causes the central region of the diaphragm to become curved and distorted, producing a non-linear, relatively complex response curve.
Figure 1A:
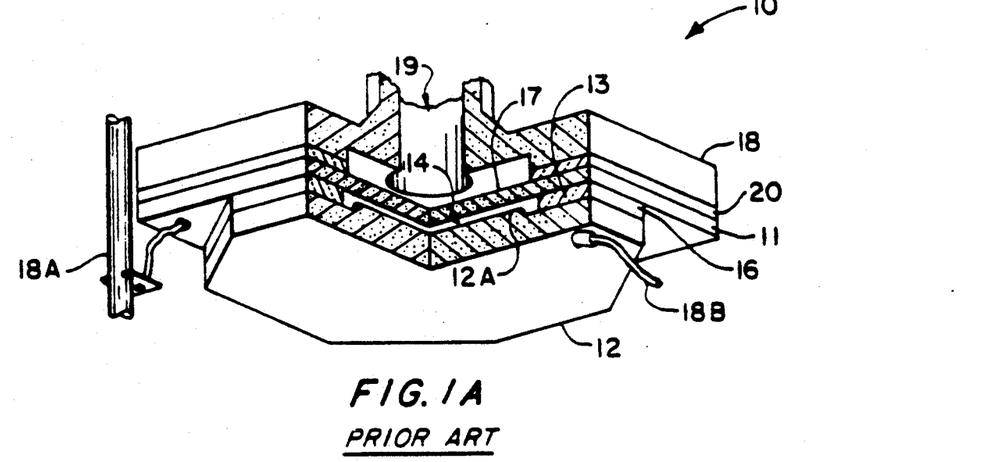
FIG. 1A is a perspective, partially cut-away view of a silicon-on-silicon, two plate capacitive pressure sensor of the prior art, which has some common structural and operational characteristics as the sensor of the present invention, and provides general background for the present invention.

An exemplary prior art, silicon-glass-silicon pressure sensor design of the sandwich type is illustrated in FIG. 1A hereof, which is substantively identical to the same figure in the '179 patent. Such a sensor or transducer 10, which typically is generally square in its exterior configuration but often at least generally and preferably circular or cylindrical in shape for its inner, operative substructure, generally identified as "$C_c$" in FIG. 1A, includes an upper, conductive, square, flexible, appropriately doped, silicon diaphragm 11 and a lower or bottom, conductive, appropriately doped, silicon base or substrate 12 with a non-conductive dielectric layer and spacer 13 (made of, for example, borosilicate glass) between them.

A closed, evacuated, hermetically sealed, reference cavity, chamber or interstice 14 is formed between the two silicon layers 11, 12. The chamber 14 is typically at a zero pressure or vacuum, or can be sealed at a higher reference pressure, at which reference level the diaphragm 11 is parallel to the silicon substrate 12, With typically a two micrometer spacing between the two.

A centrally located, typically circular pedestal or mesa 12A extends into the typically generally cylindrical, closed chamber 14 with a thin, insulating layer of glass 13A covering the top of the mesa. The circular mesa 12A serves as a counter-electrode to the deformable capacitor plate or diaphragm 11.

The mesa 12A extends up from the main surface of the silicon substrate 12 an exemplary six and a half micrometers, while having an exemplary diameter of one hundred and fifty thousandths (0.150") of an inch.

For further general background information on the exemplary application for the present invention, namely, in the design of the peripheral areas of the diaphragm 11 of the pressure sensor 10, it is noted that the wall(s) 16 might typically have a horizontal, lateral or radial thickness of, for example, thirty-six thousandths (0.036") of an inch with a height of, for example, nine (9) micrometers, while the separately applied, insulating, mesa layer of glass 13A is only about a half a micrometer thick.

The silicon diaphragm 11 and the silicon base 12 may typically be square [with corners removed for the purpose of providing access for electrical contacts to the layer(s), as illustrated], having a horizontal length of an exemplary two hundred and sixty thousandths (0.260") of an inch on an edge, while the spacer wall 16 can have an inner diameter of an exemplary one hundred and ninety thousandths. (0.190") of an inch. The outer, side surface of the wall spacer 16 can either follow the basic square configuration of the silicon layers or have an outer circular configuration.

It should be understood that the simplified FIG. 1A hereof for practical purposes of illustration is not at all to relative scale, as the glass wall or spacer 13/16 is only typically nine micrometers (9 μm) high, in contrast to the thicknesses of the silicon layers 11 & 12, which typically are eight thousandths (0.008") of an inch and fifty thousandths (0.050") inches thick, respectively, for an exemplary fifty (50 psi) pounds per square inch pressure measuring unit.

Sensor Diaphragm Hinge

As further discussed and disclosed in the '179 patent with respect to hinged diaphragms for, for example, silicon-glass-silicon sensors, these have been formed in the past by the ion beam milling or electric discharge machining out of peripheral, surrounding areas in a "pure" semiconductive wafer of silicon (note FIG. 3 of the '179 patent), or by chemically etching out peripheral, surrounding areas usually in a composite silicon (e.g. layered, silicon-glass-silicon) diaphragm, producing a "hinge" from the reduced thickness area. In the latter, etching example, the central, inner or sandwiched layer (e.g. glass) was used as an etch stop for controlling the thickness of the hinge.

However, such machining or milling is relatively expensive and more difficult to precisely control, while using a composite structure and etching to the central layer or region working as a stop produces a composite, materially non-uniform hinge, namely for the example given, a "hinge" made of composite layers of glass and silicon (note FIGS. 5 & 6 of the '179 patent). While the glass layer in the hinge area could then be machined or milled away (note FIG. 4 of the '179 patent), such again adds additional expense and introduces further variants into the hinge areas of the diaphragm. Removal of the glass layer at the hinge could also be accomplished by the use of a wet etch, for example, hydrofluoric (HF) acid.

Thus, to enhance the sensitivity of the sensor or transducer, it is desired to have a materially uniform, non-composite material for the "hinge" but to have such a hinge produced in the most straight forward and inexpensive but most reliable way feasible. The present invention achieves this goal and produces in its preferred embodiments hinges made solely of high-quality, single-crystal silicon that are inherently low stress, in contrast to the relatively high stress hinges found in other attempts.

SIMOX Technology

In the preferred embodiment of the invention a "SIMOX" (Separation by IMplanted OXygen) wafer is used as the starting material. Such a semiconductor wafer of single crystal silicon (Si) has an internal, electrically insulating, intermediate layer or region of silicon dioxide ($SiO_2$), typically about two-tenths of a micron (0.2 μm) below one of its major surfaces and typically about two-tenths of a micron (0.2 μm) thick.

The buried layer of silicon dioxide is produced in a single-crystal silicon wafer by bombarding at least one of the major surfaces ("top" or "bottom") of the wafer with high energy (e.g. 200 Kv+) ions, for example, oxygen ions ($O^-$), which enter the silicon wafer and penetrate down into the wafer surface, becoming "implanted" and forming a silicon dioxide region within the wafer. The wafers are thereafter heat treated to a high temperature, causing the silicon dioxide region to be consolidated into a very well defined, typically two tenths of a micron (0.2 μm) thick and two tenths of a micro (0.2 μm) deep, silicon dioxide, insulating layer or region. (An exemplary SIMOX wafer is illustrated in general, simplified form in FIG. 3A hereof.)

Such SIMOX wafers typically have been used to make micro-electronic, integrated circuits and typically have had to be relatively precise in their exterior surface flatness, although such precision is relatively difficult to obtain. The present invention, not only provides a new, "breakthrough" use of SIMOX type wafers, but also eliminates the need for relatively precisely made SIMOX wafers, substantially adding to the useability of SIMOX wafers and substantially reducing expensive waste.

For further background information on SIMOX wafers and their manufacture, reference is had to, for example, "Formation of $SiO_2$ Films by Oxygen-Ion Bombardment" by Watnabe and Tool from the *Japan. J. Appl. Phys.* 5 (1966, pp. 737–738); "C.M.O.S. DEVICES FABRICATED ON BURIED $SiO_2$ LAYERS FORMED BY OXYGEN IMPLANTATION INTO SILICON", *ELECTRONICS LETTERS* (Vol. 14, No. 18, Aug. 31, 1978); and "Silicon-on-Insulator Films by Oxygen Implantation and Lamp Annealing" *Solid State Technology* (Mar. 1987, pp. 93–98).

DISCLOSURE OF INVENTION

The present invention thus provides a methodology of manufacturing hinged diaphragms for semiconductor sensors or transducers and the like, starting with, for example, preferably a SIMOX wafer ("SIMOX" being the abbreviation of "Separation by IMplanted OXygen"), having an intermediate layer of silicon dioxide, and producing a hinged wafer in which the hinge is made of a single, uniform material, preferably doped silicon.

In the preferred, exemplary manufacturing processes hinged diaphragms for semiconductor sensors (e.g., accelerometers, pressure transducers, etc.), are made from a SIMOX wafer, in which the internal, insulating, silicon dioxide ($SiO_2$) layer is used as an etch stop in removing silicon material from selected, unmasked areas on the underside of the wafer by etching with an appropriately selective etch, producing the reduced thickness, peripheral "hinge" areas. The exposed part of the silicon dioxide layer is then removed in a subsequent etching step using a different, suitably selective etchant. This produces a single layer, single-crystal, silicon "hinge" of uniform, continuous material, enhancing the linearity of diaphragm movement during use and the sensor's sensitivity and accuracy.

If the top, silicon region of the SIMOX wafer is insufficiently thick for the desired diaphragm thickness, additional layer(s) of epitaxial silicon are grown on the upper side of the silicon crystal until the desired thickness is reached. The same technique of epitaxial growth can be used either concurrently or independently for increasing the thickness of the silicon substrate.

If it is desired to have reduced thickness areas for the "hinge" on both sides of the diaphragm, a SIMOX wafer having an intermediate, silicon dioxide layer on both the "bottom" and the "top" of the wafer is used, with each layer serving as an etch stop on its respective side. After the first etch step on both the bottom and top of the wafer, the then exposed parts of the silicon dioxide layers are thereafter removed with a different, suitably selective etchant. Continued etching with the silicon selective etchant then exposes the etch stop layers of silicon dioxide. The top side hinged etch stop is reached by etching from the bottom, and the bottom side hinge etch stop is reached by etching from the top.

In this type of embodiment it should be realized that hinge segments must be alternatively disposed front and back and can only occupy somewhat less than half the annular hinge area, front or back. Additionally, it is preferable that the top and bottom hinges flank one another on each side of the central body or diaphragm, in an alternating pattern. In the situation where there is, for example, one, centralized top hinge with two, flanking bottom hinges (or vice-versa), the single, centralized hinge is twice the width of each of the lower ones, with all of them having the same thicknesses, in order to eliminate torque, maintaining the spring constant of the over-all hinge. This minimizes cross-axis sensitivity.

Another configuration of sensor can be fabricated by utilizing the properties of the well known preferential (anisotropic) silicon etchants. These etchants etch silicon at different rates for different crystallographic directions. Indeed, for some etchants there is a direction for which the rate is very small. The crystal plane corresponding to this direction is the well known "stopping plane". For silicon the stopping plane is the (111) plane. To fabricate sensors using anisotropic etchants the diaphragm should be rectangular (or square) bounded laterally by stopping planes and with hinges defined vertically by etch stop layers.

It should be understood that, although a SIMOX wafer with a silicon dioxide layer produced by oxygen ion bombardment is the currently preferred starting material, other bombarding ions could be used in making the integral, internal, insulating layer. Thus, other starting materials beside a SIMOX wafer could be used, if so desired.

It is therefore an object of the present invention to produce preferably silicon diaphragms for semiconductor sensors having hinges of pure, single material, preferably of silicon.

It is another object of the present invention to do so, using as a starting material a wafer made by a SIMOX-type process, in which an intermediate layer is made in a wafer of silicon by bombarding at least one side of the wafer with high energy ions, such as oxygen ions or the like, and thereafter using that intermediate layer as an etch stop to remove the silicon from one side of that layer at unmasked areas as a preliminary step in producing the silicon hinge.

It is still a further object to ultimately produce a hinge made solely of high-quality, single-crystal silicon that is inherently low stress, using preferably only etching techniques.

Other features and advantages will be apparent from the specification and claims and from the accompanying drawings, which illustrate two exemplary embodiments of the invention and which use like reference numbers for analogous parts.

BRIEF DESCRIPTION OF DRAWINGS

For a further understanding of the nature and objects of the present invention, reference should be had to the following detailed description, taken in conjunction with the accompanying drawing, wherein.

MODES FOR CARRYING OUT THE INVENTION

Hinged vs. Non-Hinged Diaphragms

Figure 2:
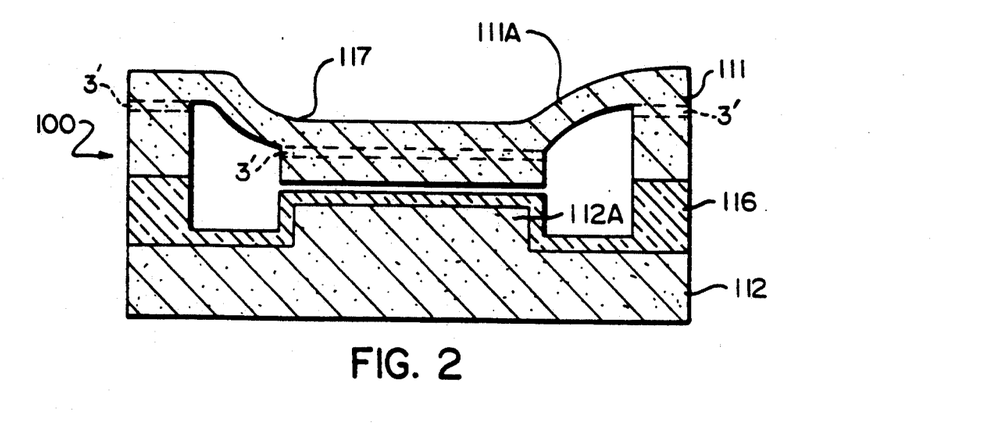

In contrast to the curved or non-planar, distorted deflection of the diaphragm 11 of the prior art shown in FIG. 1, as can be seen in FIG. 2, in the exemplary sensor 100 of the present invention the diaphragm 111 in its central region 117 remains planar as it moves relatively linearly toward the mesa plate 112A on the substrate or base 112. The thinner, peripheral "hinge" areas 111A deform, allowing the main, central region 117 to move linearly, while maintaining its planarity with respect to the upper surface of the mesa 112A.

As is true of most designs, the mesa 112A is provided on the interior facing side of the semiconductive substrate 112 extending into the closed and evacuated reference chamber formed between and within the confines of the base 112, the diaphragm 111 and the side wall(s) 116. The hinge 111A preferably has the same lateral configuration as the mesa 112A (typically circular) with their peripheries preferably coextensive, that is, with the inner periphery of the hinge preferably lying above the outer periphery of the mesa.

The hinge 111A is preferably provided in the form of a continuous, circular, indented trough, substantially decreasing the effective thickness of the preferably disc-shaped diaphragm 111 at the hinge areas in comparison to its thickness at its central region 117. The relative thicknesses of the two can have a ratio of the thickness of the central region or proof mass to the hinge thickness of, for example, about two hundred and fifty to one (250:1) or even higher ratios.

Two exemplary embodiments of the methodology of the invention will now be described with reference to FIGS. 3-5. However it is noted that, because there are many similarities, if not identity, between various analogous parts which bear analogous reference numbers, all of the various parts will not be described in detail for the sake of brevity, but only the differences discussed.

SIMOX Wafer to Hinged, Sensor Diaphragms

Figure 3A:
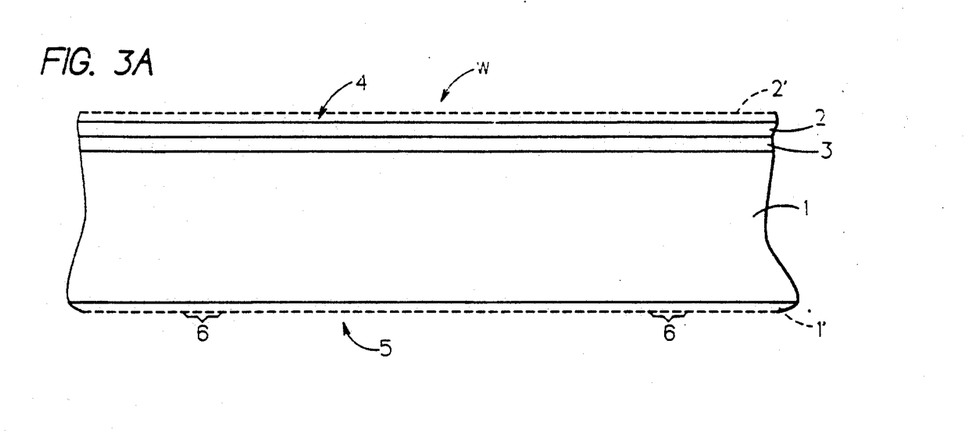
FIGS. 3A-3C is a series of side views showing the progression of the wafer material, starting with the standard SIMOX wafer in FIG. 3A and ending with the completed hinged diaphragm material in FIG. 3C, with the produced hinged areas being of a single, uniform material (suitably doped silicon as part of the single crystalline structure of the wafer itself), following the preferred, exemplary embodiment of the present invention.
Figure 3B:
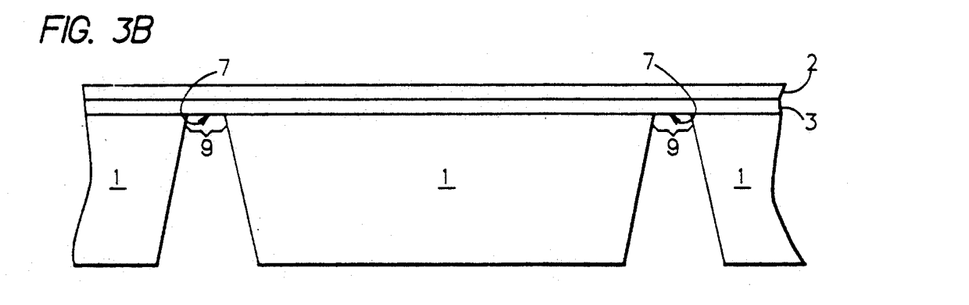
Figure 4:
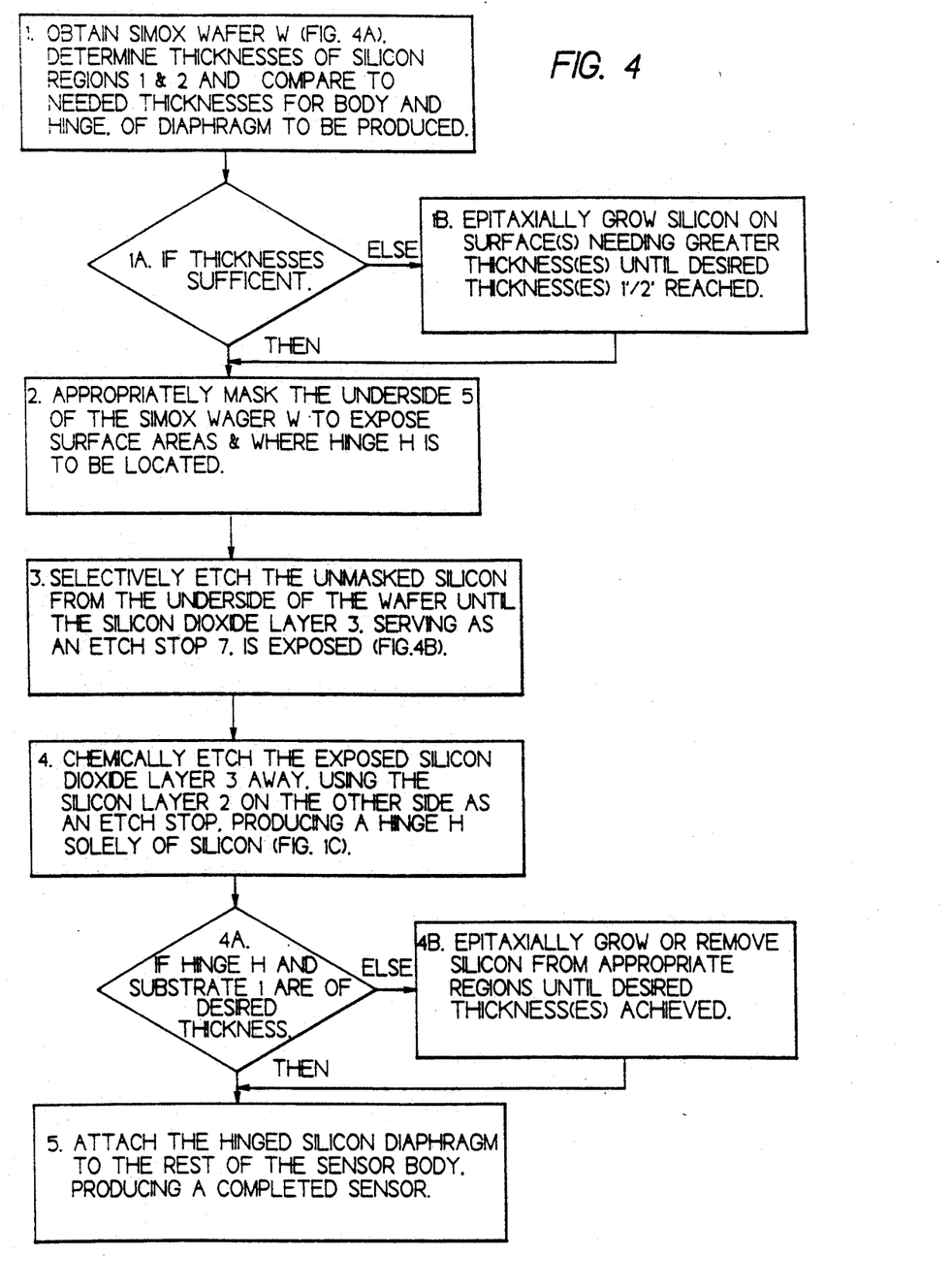
FIG. 4 is a flow chart setting out the sequence of steps followed in the preferred, exemplary methodology of the present invention to manufacture hinged diaphragms, of the type illustrated in FIGS. 3A-C.

As can be seen in FIG. 3, an exemplary SIMOX wafer W, as produced in the current state of the art, comprises a body of single-crystal silicon suitably doped to make it a semiconductor. The wafer W includes three regions, a basic body or lower substrate 1 of silicon, an upper region of silicon 2 [typically two tenths of a micron (0.2 $\mu$m) thick] and an intermediate layer of silicon dioxide ($SiO_2$), typically also about two tenths of a micron (0.2 $\mu$m) thick (although many other dimensions are possible).

The silicon dioxide layer 3 is produced in the silicon wafer W by bombarding its upper surface 4 with high energy oxygen ions ($O^-$) and then heat treating the bombarded wafer, in a manner well known to those of ordinary skill in the SIMOX art.

Using the methodology of the present invention (detailed below), such a SIMOX wafer W can be used to make the improved hinged diaphragms for the semiconductor sensors of the invention, and, in step 1 (FIG. 4), such a wafer is obtained as the preferred starting material in the preferred process of the invention. Nonetheless, it should be understood that, although a SIMOX wafer with a silicon dioxide layer produced by oxygen ion bombardment is the currently preferred starting material, other bombarding ions could be used or other starting materials beside a SIMOX wafer could be used, if so desired.

In the preferred methodology of the present invention (step 1) the thicknesses of the silicon substrate 1 and the upper silicon region 2 (the latter ultimately to become the "hinge" in selected areas) are determined and compared to the desired end thicknesses of the diaphragm body and the hinge. In steps 1A & 1B, if a greater thickness in either part is desired, epitaxial silicon is grown on the pertinent surface(s) 1'/2' until the desired thickness(es) are obtained. Likewise, if either thickness is greater than desired, the excess thickness can be removed by suitable means, such as etching, milling, machining, etc.

In step 2 the underside 5 (note FIG. 3A) of the SIMOX wafer W is then suitably masked to expose the areas 6 of silicon which need to be etched away to produce the desired reduced areas of thickness in the form of, for example, an indented "trough", to form the hinge. Typically, the unmasked areas 6 will form circles, although other shapes can be formed, if so desired. It should be understood that the diaphragms will usually be made "in bulk," i.e., with a number of them being simultaneously made in a single wafer, to thereafter be cut apart to be used in individual sensors.

In step 3 the underside 5 of the wafer W is then subjected to a selective, isotrophic, chemical etch, such as, for example, a plasma etch or a high temperature, etch, such as anhydrous, hydrochloric acid, until the silicon of the unmasked part of the substrate 1 has been etched away in a process well known in the art, until the underside 7 (note FIG. 3B) of the silicon dioxide layer 3 is reached. At that point the selective etch has relatively little reaction with the silicon dioxide, with the layer 3 serving as an "etch stop," producing the wafer state $W_1$ illustrated in FIG. 3B.

Thereafter, in step 4, another, different etch, for example, hydrofluoric (HF) acid, which attacks the silicon dioxide layer but to which the silicon of the regions 1 & 2 are relatively impervious, is applied to the underside of the wafer $W_1$ in, for example, a dilute, hydroflouric bath, until the underside 8 of the silicon region 2 is reached. This produces the wafer state $W_2$ of FIG. 3C, which results in circular hinge areas 9 of high quality, single-crystal silicon, forming a hinge that is inherently low stress.

The remaining silicon dioxide areas 3' must be electrically continuous with the bulk of the proof mass or main body 1 of the wafer during the completed device's use as a hinged diaphragm in a semiconductor sensor. This can be achieved in a number of different ways, including, for example, suitably masking the appropriate areas on the surface of the wafer to selectively block portions of the wafer during the high energy oxygen ion bombardment which produces the $SiO_2$ layer during the manufacture of the SIMOX wafer. "Holes" (where the mask was present) can thus be created in the remaining insulating layer 3', causing silicon region 2 to be electrically common with silicon region 1.

Figure 3C:
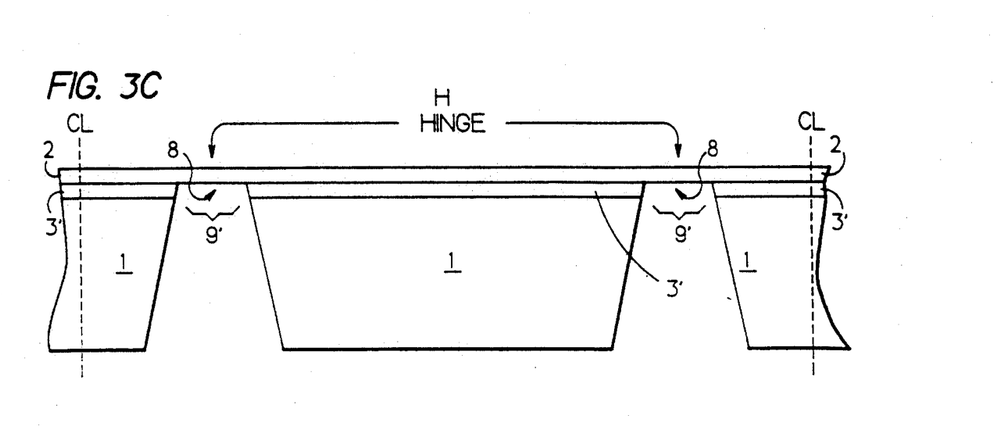

At the completion of the wafer state $W_2$ of FIG. 3C (step 4), the thickness of either (or both of) the silicon hinge 9 or the silicon substrate 1 can be altered, as desired (see steps 3A & 3B), as a complement to or a substitute for Step 1 supra. Of course, as appropriate, etch and growth masks are added and removed at the appropriate points during the manufacturing process, in accordance with the masking and epitaxially growing techniques known in the art.

When produced "in bulk," in step 5, each individual, circular diaphragm is thereafter cut-out from the bulk wafer body along the circular cut-lines CL, either before or after it is combined with the silicon sensor body to produce a complete sensor.

As can be seen in FIG. 3C, the finished hinge 9' is at the "top" (or "bottom") of the over-all, single-crystal silicon body of the diaphragm. If it is desired to have the hinge centrally located down with respect to the overall, single-crystal silicon body of the diaphragm, i.e. at its middle, a "double" SIMOX wafer WW (FIG. 5A-C), having had both of its major surfaces ("top" and "bottom" or "upper" and "lower") bombarded to produce two, integrally formed, internal silicon dioxide layers 3a & 3b beneath two semiconductive, silicon surface layers 2a & 2b can be used as the starting material and processed in generally the same steps outlined supra with reference to FIGS. 3-4.

Analogous to steps 1-4 supra (the analogous details of which will not be repeated here for the sake of brevity), the semiconductive, doped silicon in hinge areas 6a & 6b (note FIG. 5C) are first removed by using a selective chemical etchant, such as, for example, potassium hydroxide (KOH) or ethylene diamine pyrocatechol (EDP), and then the exposed, outside areas of the respective, near silicon dioxide layers 3a & 3b are removed by a different etch, such as, for example, by using hydroflouric acid, producing an interim structure. A suitable etchant for the centralized silicon body areas is used, removing the intermediate, relatively thick silicon region 1ab of the wafer, until the far silicon dioxide layers 3b, 3a, respectively, are reached at their inner sides. This produces the further, interim structure shown in FIG. 5C.

In a final etching step, the then, inner side, exposed portions of the far silicon dioxide layers are etched away until the remaining, relatively thin outer, surface layers 2b, 2a, respectively, of silicon are reached. This process leaves or produces the centrally located, rectangular "pure" single-crystal, low stress, silicon hinge areas or bridges 90a & 90b in the manufactured, square diaphragm made from the centrally located, silicon region 1ab, the remaining central portion 91 of Which forms the proof mass for the sensor.

As a result of the cross-etching process, i.e., etching from both the top and bottom sides, apertures or openings 92 (note FIGS. 5A & 5B) are produceD through the SIMOX wafer body WW. As can be seen in the close-up detail of FIG. 5B, the edges of the two insulating layers 3a & 3b can be seen in the body of the leading to the hinge bridges 90b (or 90a when viewed from the underside).

The thickness of the centrally located hinge 90a & 90b can be reduced, if so desired, by further etching, milling or machining of it, or, if so desired, their thicknesses can be increased by epitaxial growth techniques.

Figure 5A:
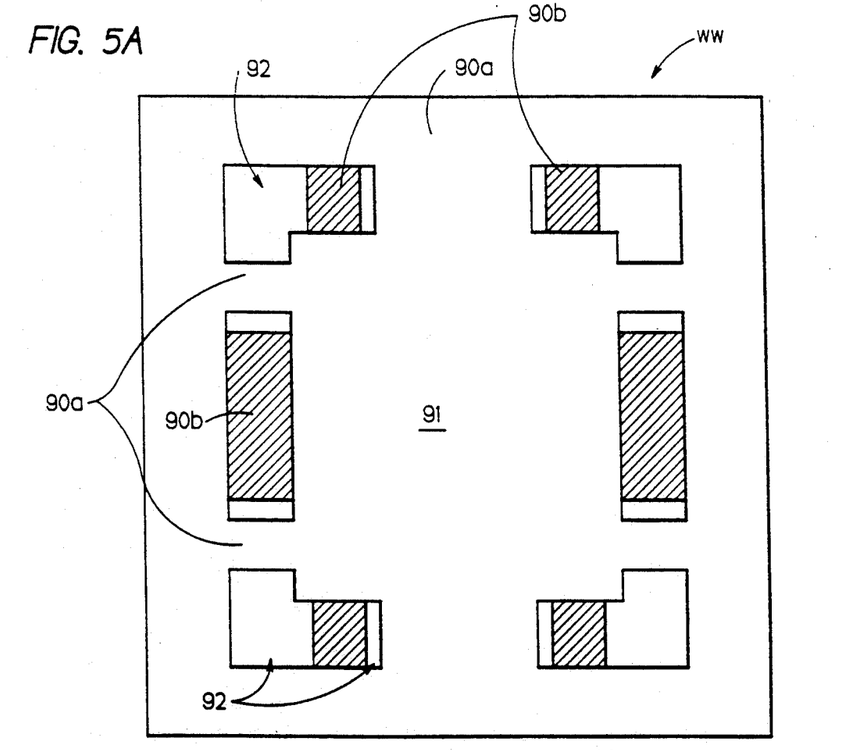
FIGS. 5A-5C are simplified, not-to-scale diagrams showing in plan, close-up/detail and side/cross-sectional views, respectively, with FIG. 5C being taken along section line 5C—5C of FIG. 5A, of an alternate, exemplary SIMOX wafer having an internal layer or region of silicon dioxide (SiO$_2$) on both its "top" and "bottom" sides, with the silicon and silicon dioxide areas removed by etching, leaving a centrally located diaphragm with upper and lower, complementary, silicon "hinges", with the lower hinged areas highlighted by cross-hatching in FIG. 5A.
Figures 5B, 5C:
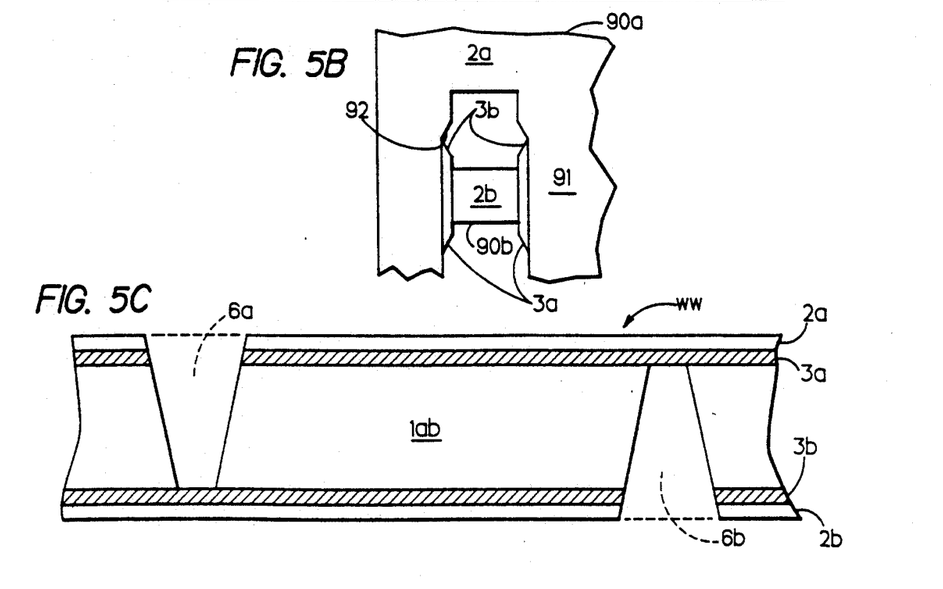

As can be seen particularly in FIG. 5A, the upper and lower hinge areas or bridges 90a & 90b flank one another on complementary sides, forming with one another an alternating pattern on each side and with respect to the next adjacent side. Additionally, the combined widths of the two flanking hinge bridges (e.g. the "upper" ones in the left hand side of the figure) preferably equal the width of the centrally located, flanked one (e.g. lower one in the left hand side of figure, with all of them having substantially the same thickness.

The embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

We claim:

1. A method of manufacturing a hinged diaphragm for a semiconductive sensor, comprising the following steps:
    a) obtaining a wafer of single-crystal, semiconductive material having an internal insulating layer integrally formed within it as the starting material to ultimately produce the diaphragm;
    b) selectively chemically etching away some of the semiconductive material of the wafer, producing a reduced thickness area at the location of the wafer to become the hinge in the diaphragm, using the insulating layer as an etch stop, until a portion of the insulating layer is exposed; and
    c) removing the exposed portion of the insulating layer until the semiconductive material on the other side of the insulating layer is exposed, producing a hinge of single-crystal, semiconductive material.

2. The method of claim 1, wherein there is included the following steps:
    producing a diaphragm made completely of single-crystal silicon and integrally forming said hinge by removing a portion of the silicon to form an indented trough in the silicon.

3. The method of claim 1, wherein there is included in step "c" the step of:
    selectively chemically etching out the exposed portion hinge of the insulating layer using the semiconductive material on the other side of the insulating layer as an etch stop, using a different chemical etch than that used in step "b".

4. The method of claim 1, Wherein there is included in step "a" the steps:
    using a SIMOX wafer as the starting material with doped silicon as the semiconductive material with an integral, intermediate, insulating layer of silicon dioxide between a relatively thin layer of doped silicon, which will provide the "hinge" and a relatively thick, substrate layer of doped silicon, which will provide the body of the diaphragm.

5. The method of claim 4, wherein there is included the following steps:
    using an etchant from the group consisting of a plasma etch and high temperature, anhydrous hydrochloric acid (HCl), as the chemical etch in step "b".

6. The method of claim 4, wherein there is included in step "c" the following steps:
    selectively chemically etching out the exposed portion of the insulating layer using the semiconductive material on the other side of the insulating layer as an etch stop, using a different chemical etch than that used in step "b"; and
    using hydrofluoric (HF) acid as the chemical etch in step "c".

7. The method of claim 4, wherein there is included the further steps of:
    increasing the thickness of at least the relatively thin layer of silicon by epitaxially growing silicon on it.

8. The method of claim 1, wherein there is included the following steps:
    performing step "a" by obtaining a wafer of single-crystal, semiconductive material, having on its top side an internal insulating layer integrally formed within it and on its bottom side an internal insulating layer integrally formed within it, with the two insulating layers being separated by a central region of semiconductive material, as the starting material to ultimately produce the diaphragm;
    performing step "b" by selectively chemically etching away some of the semiconductive material on both the top and bottom sides of the wafer, producing reduced thickness areas in both the top and bottom sides of the wafer at the locations of the wafer to become the hinge in the diaphragm, using the insulating layer on each side as an etch stop, until a portion of the respective insulating layer is exposed; and
    performing step "c" by removing the exposed portion of the insulating layer on each side until the semiconductive material on the other side of the each insulating layer in the central region is exposed, producing a centrally located hinge of single-crystal, semiconductive material.

9. The method of claim 8, wherein there is included the following steps:
    performing step "b" by selectively chemically etching away some of the semiconductive material on both the top and bottom sides of the wafer forming flanking, alternating, hinge portions, producing flanking, alternating, reduced thickness areas in both the top and bottom sides of the wafer at the locations of the wafer for the hinge for the diaphragm, using the insulating layer on each side as an etch stop, until a portion of the respective insulating layer is exposed.

10. A method of manufacturing a hinged diaphragm for a capacitive, semiconductive-dielectric-semiconductive sensor, which sensor will include
   a conductive substrate of semiconductor material,
   a conductive diaphragm of semiconductor material, the diaphragm having an inner, central region and an outer area, the diaphragm being capable of flexing movement in its central region due to the action of physical changes to be sensed, a "hinge" being formed at the outer, peripheral area of the diaphragm by including an area surrounding said central region of substantially less thickness than the thickness of the central region of said diaphragm, causing the central region of said diaphragm to remain planar as it moves relatively linearly up and down under the action of the physical changes as the hinge flexes, and
   a non-conductive, dielectric layer between the semiconductive substrate and the semiconductive diaphragm, the dielectric layer providing peripheral wall(s) extending between and joining the semiconductive substrate and the semiconductive diaphragm; an evacuated reference chamber being formed between the semiconductive substrate and the semiconductive diaphragm and being closed off by the peripheral wall(s) formed by the dielectric layer between the semiconductive substrate and the semiconductive diaphragm; the flexing movement of the semiconductive diaphragm due to the physical changes, causing the capacitance of the sensor to vary;
comprising the following steps:
   a) obtaining a SIMOX wafer of single-crystal, semiconductive, doped silicon material having an internal insulating layer of silicon dioxide integrally formed within it, between a relatively thin layer of doped silicon, which will provide the "hinge" and a relatively thick, substrate layer of doped silicon, which will provide the body of the diaphragm, as the starting material to ultimately produce said diaphragm;
   b) selectively chemically etching away some of the semiconductive, silicon material of the wafer, producing a reduced thickness area in the location of the wafer to become the hinge in the diaphragm, using the silicon dioxide insulating layer as an etch stop, until a portion of the insulating layer is exposed; and
   c) selectively chemically etching out the exposed portion of the insulating layer using the semiconductive, silicon material on the other side of the insulating layer as an etch stop, using a different chemical etch than that used in step "b", until the semiconductive, silicon material on the other side of the insulating layer is exposed, producing a hinge of single-crystal, semiconductive, silicon material.

11. The method of claim 10, wherein there is included the further steps of:
   increasing the thickness of at least the relatively thin layer of silicon by epitaxially growing silicon on it.

12. The method of claim 10, wherein there is included the following steps:
   performing step "a" by obtaining a wafer of single-crystal, semiconductive, silicon material, having on its top side an internal insulating layer of silicon dioxide integrally formed within it and on its bottom side an internal insulating layer of silicon dioxide integrally formed within it, with the two insulating layers being separated by a central region of semiconductive, silicon material, as the starting material to ultimately produce the diaphragm;
   performing step "b" by selectively chemically etching away some of the semiconductive, silicon material on both the top and bottom sides of the wafer, producing reduced thickness areas in both the top and bottom sides of the wafer at the locations of the wafer to become the hinge in the diaphragm, using the silicon dioxide insulating layer on each side as an etch stop, until a portion of the respective silicon dioxide insulating layer is exposed; and
   performing step "c" by removing the exposed portion of the silicon dioxide insulating layer on each side until the semiconductive, silicon material on the other side of the each insulating layer in the central region is exposed, producing a centrally located hinge of single-crystal, semiconductive, silicon material.

13. A method of making a hinged diaphragm for a capacitive, semiconductive-dialectric-semiconductive sensor, comprising the steps of:
   manufacturing said diaphragm from a SIMOX wafer of single-crystal, semiconductive, doped silicon material having an integral insulating layer of silicon dioxide integrally formed within it;
   wherein said SIMOX wafer includes a relatively thin layer of doped silicon and a relatively thick, substrate layer of doped silicon, and wherein there is included the further steps of
   using the SIMOX wafer as the starting material and the intermediate, insulating layer of silicon dioxide to make the "hinge" and the relatively thick, substraet layer of doped silicon for the body of the diaphragm;
   selectively chemically etching away some of the semiconductive, silicon material of the wafer, producing a reduced thickness area in the location of the wafer to ultimately become the hinge for the diaphragm using the silicon dioxide insulating layer as an etch stop, until a portion of the insulating layer is exposed.

14. The method of claim 13, wherein there is included the further steps of:
   selectively chemically etching out the exposed portion of the insulating layer using the semiconductive, silicon material on the other side of the insulating layer as an etch stop, using a different chemical etch than that used in step "a", until the semiconductive, silicon material on the other side of the insulating layer is exposed, producing a hinge of single-crystal, semiconductive, silicon material.

15. A hinged diaphragm structure for a semiconductive sensor, comprising:
   a wafer of single-crystal, semiconductive material having an upper, main surface and an upper, internal, insulating layer integrally formed within it from high energy ion bombardment through said main surface, said upper insulating layer being spaced down within the material away from but substantially parallel to said main surface; and upper, reduced thickness areas going down through said main surface forming the hinge for the diaphragm, said reduced thickness areas having been created in the material of the wafer with a chemical, selective etchant using the insulating layer as an etch stop, exposing a portion of the insulating layer, with that exposed portion of the insulating layer thereafter removed to the semiconductive material on the other side of the insulating layer, an internal, side edge of said upper insulating layer being exposed in said reduced thickness areas.

16. The diaphragm structure of claim 15 having a proof mass, wherein:

said upper, reduced thickness areas form together a trough surrounding the proof mass of the diaphragm of the sensor.

17. The diaphragm structure of claim 15, wherein:

said wafer is a SIMOX wafer of silicon material, the bombarding ions having been oxygen ions, with said, insulating layer being silicon dioxide ($SiO_2$).

18. The diaphragm structure of claim 15, wherein:

said wafer also includes a lower surface substantially parallel to said upper, main surface and a second, internal, insulating layer integrally formed within it from ion bombardment through said lower surface, said lower insulating layer being spaced down within the material away from but substantially parallel to said lower surface; and lower, reduced thickness areas going down through said lower surface forming with said reduced areas through said main surface the hinge for the diaphragm, said upper and said lower, reduced thickness areas having been created in the material of the wafer with a chemical, selective etchant using the upper and lower, insulating layers as etch stops, exposing a portion of said upper and lower, insulating layers, with those exposed portions of said insulating layers thereafter removed to the semiconductive material on the other side of the insulating layers, internal, side edges of said upper and lower, insulating layers being exposed in said upper and lower, reduced thickness areas.

19. The diaphragm structure of claim 18, wherein:

said upper and lower, reduced areas form flanking, alternating, hinge bridges from the periphery of said wafer to the central portion of said wafer.

20. The diaphragm structure of claim 15, wherein:

said upper insulated layer is about two tenths of a micron deep within the wafer and is about two tenths of a micron thick.

* * * * *